United States Patent [19]

Jacks

[11] Patent Number: 5,753,718
[45] Date of Patent: May 19, 1998

[54] LOW COMPRESSION SET FLUOROELASTOMER POLYMER FOAM AND METHOD

[75] Inventor: James W. Jacks, Roanoke, Va.

[73] Assignee: Acadia Polymers, Roanoke, Va.

[21] Appl. No.: 404,602

[22] Filed: Mar. 15, 1995

[51] Int. Cl.$^6$ ............................................. C08J 9/06
[52] U.S. Cl. ........................... 521/88; 521/51; 521/54; 521/98; 521/134; 521/142; 521/145; 525/191; 525/199; 264/455
[58] Field of Search ............... 521/88, 51, 54, 521/98, 134, 142, 145; 525/199, 191; 264/45.5

[56] References Cited

U.S. PATENT DOCUMENTS

| | | |
|---|---|---|
| 3,072,583 | 1/1963 | Randa . |
| 3,142,660 | 7/1964 | Conger . |
| 3,575,897 | 4/1971 | Port et al. . |
| 3,770,662 | 11/1973 | Hennessy et al. . |
| 3,868,337 | 2/1975 | Gros . |
| 4,560,829 | 12/1985 | Reed et al. . |
| 4,650,815 | 3/1987 | Namba et al. . |
| 4,692,381 | 9/1987 | Pecsok . |
| 4,737,526 | 4/1988 | Mukaiyama et al. . |
| 4,748,190 | 5/1988 | Carl . |
| 4,764,538 | 8/1988 | Buckmaster et al. . |
| 4,843,123 | 6/1989 | Lee . |
| 4,882,113 | 11/1989 | Tu et al. . |
| 5,032,621 | 7/1991 | Buckmaster et al. . |
| 5,166,183 | 11/1992 | Franyutti et al. . |
| 5,194,459 | 3/1993 | Sato et al. . |

OTHER PUBLICATIONS

Fluorel®—Fluorelastomer Processing Information, pp. 1–8.

*Primary Examiner*—Duc Truong
*Attorney, Agent, or Firm*—Dickstein Shapiro Morin & Oshinsky LLP

[57] ABSTRACT

A fluoroelastomer polymer foam having a compression set value in the range of from about 8.3% to about 43% and closed cell microvoids having diameters of from about 0.002 mm to about 0.048 mm or less, and a method for foaming a fluoroelastomer polymer comprising the steps of dispersing in a fluoroelastomer polymer to be foamed a phenol-based blowing agent to produce a foaming formulation and curing the formulation at a temperature of from about 250° F. (121° C.) to about 450° F. (232° C.) and a pressure of from about ambient to about 3.0 atm.

14 Claims, 3 Drawing Sheets

LOW COMPRESSION SET FLUOROELASTOMER POLYMER FOAM AND METHOD

FIELD OF THE INVENTION

The present invention relates to a fluoroelastomer polymer foam and a method for its production. In particular, the present invention relates to a fluoroelastomer polymer foam having uniform, closed cell microvoids, an integral skin, and low compression set.

DESCRIPTION OF THE RELATED ART

In numerous applications it is desirable to produce fluoroelastomer polymer foams which have a low compression set. However, a key problem with current fluoroelastomer polymer foam technology is poor compression set characteristics. On samples considered to be representative of the state of the art, compression set was 150 percent after 22 hours at 400° F. (204° C.)

Most if not all methods currently employed for producing foamed fluoroelastomer polymers rely on the use of blowing and foaming agents such as $N_2$, $CO_2$ or CFCs, which may pose a threat to the environment. Also, these methods utilize substantial curing temperatures and pressures, often in excess of about 250° C. (482° F.) and considerably in excess of atmospheric pressure.

For example, U.S. Pat. No. 4,560,829 refers to foamed fluoropolymers having low loss at microwave frequencies prepared through the use of perfluorinated alkane foaming agents of the formula $C_nF_{2n+2}$ and prepared using processing temperatures of at least 200° C. (392° F.), and preferably at least 280° C. (536° F.)

U.S. Pat. No. 4,650,815 refers to foamed articles of fluorocarbon resins produced utilizing extrusion temperatures of between 300° C. (572° F.) and 380° C. (716° F.) and using blowing agents including polycarbonyl-oxy compounds.

U.S. Pat. No. 3,770,662 refers to a fluoroelastomeric article which is extruded and subsequently blown to produce a foamed elastomeric product using a blowing agent which includes p,p,'-oxybis(benzenesulfonyl-hydrazide), azodicarbonamide, or a like nitrogen-producing chemical, and which is activated only at a temperature substantially higher than that effective to activate the curing agent.

U.S. Pat. No. 4,764,538 refers to temperatures ranging from 230° C. (446° F.) to 395° C. (743° F.), gas pressures ranging from 515 kPa to 825 kPa, and fluoropolymer resin compositions which are produced using chlorodifluoromethane, nitrogen or a neon-helium 3:1 mixture as a blowing agent.

U.S. Pat. No. 4,692,381 refers to foamable and foamed polyvinlyidene fluoride materials prepared using a blowing agent having an activation temperature above the melting point of the PVDF and defined as a compound having the formula ROOC—HN—HN—COOR'. The patent also refers to the utilization of extruder zone temperatures ranging from 200° C. (392° F.) to 300° C. (572° F.) and a pressure of 4000 p.s.i.

U.S. Pat. No. 4,737,526 refers to an expandable fluorine-containing polymer composition and a foam obtained from the composition using a blowing agent such as a hydrocarbon, a chlorinated hydrocarbon or a fluorinated hydrocarbon, and temperatures of 300° C. (572° F.), 220° C. (428° F.), and 280° C. (536° F.)

SUMMARY OF THE INVENTION

Accordingly, one object of the invention is to provide an improved, environmentally safe fluoroelastomer polymer foam and method.

Another object of the invention is to provide a fluoroelastomer polymer foam with uniform, closed cell microvoids and improved compression set properties.

Another object of the invention is to provide a fluoroelastomer polymer foam with an integral skin and improved durometer and dimensional consistency.

Yet another object of the invention is to provide a fluoroelastomer polymer foam for making precision mechanical goods including seals, gaskets, hoses, copier rolls, and high tolerance, high performance machine components.

To achieve these and other objects, and in accordance with the purpose of the invention as embodied and broadly described herein, the present invention provides a fluoroelastomer polymer foam which is preferably characterized by (a) a compression set value in the range of from about 8.3% to about 43%; (b) uniform, closed cell microvoids having diameters of preferably from about 0.002 mm to about 0.05 mm or less; and by (c) a specific gravity of preferably from about 0.86 to about 1.9. In another embodiment of the invention, a fluoroelastomer polymer foam is provided which is characterized by an integral skin, a Shore A durometer of preferably from about 45 to about 62 points, and high dimensional consistency. The fluoroelastomer polymer foam of the invention is particularly well-suited for use in making high performance, high tolerance mechanical goods.

The invention also provides a method for producing a foamed fluoroelastomer polymer comprising the steps of dispersing in a fluoroelastomer polymer to be foamed a phenol-based blowing agent to produce a foaming formulation and curing the formulation at a temperature in the range of from about 250° F. (121° C.) to about 450° F. (232° C.) at a pressure of from about ambient pressure to about 3.0 atm to produce a foam. According to another embodiment of the invention, a metal oxide such as $MgO_2$ is also dispersed in the fluoroelastomer polymer to be foamed to capture any reaction water following the foam formation.

Additional features and advantages of the invention will be set forth in the description which follows and in part will be apparent from the description or may be learned by practice of the invention.

BRIEF DESCRIPTION OF THE DRAWINGS

The accompanying drawings, which are included to provide a further understanding of the invention and which are incorporated in and constitute a part of this specification, illustrate various embodiments of the invention and, together with the description, serve to explain the principles of the invention.

DESCRIPTION OF THE PREFERRED EMBODIMENTS

Reference will now be made in detail to the presently preferred embodiments of the invention. The present invention provides an improved fluoroelastomer polymer foam. This foam, which is a sponge like, microvoid containing material with an integral skin, is produced by a method in which a phenol-based blowing agent such as a bisphenol A is used in the foaming process instead of conventional blowing agents such as CFCs, $N_2$ or $CO_2$. Therefore, the present invention provides the additional benefit of minimizing reliance on environmentally deleterious agents such as CFCs. The foam is also unique in that it is produced by a method in which water, formed in situ, acts as the foaming agent.

Prior to the present invention, it was known to use bisphenol as a curing agent to aid cross-link formation between polymer chains during the curing of fluoroelastomers. This cure mechanism involves a condensation reaction which yields water as a byproduct. Before the instant invention, the potential formation of water during the condensation reaction was regarded as a nuisance. At the high curing temperatures and pressures associated with the prior art, typically from about 350° F. (177° C.) to about 400° F. (204° C.) and typically well in excess of atmospheric pressure, water formation was consequently controlled. Furthermore, in prior art fluoroelastomer formulations any water formed in the condensation reaction was typically scavenged by metal oxides such as $MgO_2$ or other ingredients. Table 1, for example, shows the reaction steps during vulcanization of an organophosphonium salt/bisphenol cure package in which reaction water formed during the formation of dehydrofluorinants (step 1) is later absorbed by a metal oxide (step 7).

TABLE 1

SCHEMATIC REACTION STEPS
WITH BISPHENOL VULCANIZATION

1) Formation of Dehydrofluorinants $R_4P^+Cl^- + Ca(OH)_2 \longrightarrow R_4P^+OH^- + Ca(OH)Cl$ $R_4P^+OH^- + HO-Ar-OH \longrightarrow R_4P^+O^- -Ar-OH + H_2O$ 2) Dehydrofluorination 3) Monofunctional Attachment TABLE 1-continued 4) Crosslink-site Activiation 5) Crosslinking 6) Phosphonium Reactivation $R_4P^+F^- + Ca(OH)_2 \longrightarrow R_4P^+OH^- + Ca(OH)F$ 7) Absorption of Reaction Water $H_2O + MgO \longrightarrow Mg(OH)_2$ 8) Phosphonium Deactivation $R_4P^+OH^- \longrightarrow R_3P=O + RH$ I have discovered that if the curing process is carried out at a temperature in the range of from about 250° F. (121° C.) to about 450° F. (232° C.) and at a pressure of from about ambient pressure to about 3.0 atm, bisphenol not only acts as a cross-linking agent, but also as a blowing agent to produce water. Moreover, this water, rather than being dissipated or scavenged as in the prior art, acts as a foaming agent to foam the fluoroelastomer polymer, thereby creating the improved fluoroelastomer polymer foam of the invention. Water is suitable for use as a foaming agent in the present invention because it forms a gas (steam) when heated.

Accordingly, the present invention uses a phenol-based compound, such as a bisphenol A, as a blowing agent and water as a foaming agent. The term blowing agent as used herein means a compound which by decomposition or chemical reaction produces a compound suitable for use as a foaming agent according to the invention. The term foaming agent as used herein means a compound which when heated is converted into a gaseous state and is capable of expansion.

While retention of suitable compression set characteristics has remained a problem with prior art sponge materials, the highly uniform nature of the cellular structure of the fluoroelastomer polymer foam of the present invention results in excellent compression set characteristics. Compression set measures the ability of foam materials to retain elastic properties after prolonged action of compressive stresses. Compression set is measured herein using the American Society for Testing and Materials's ("ASTM") test designation D 395-89.

Following these procedures (also described below) for measuring compression set, the foamed material of the present invention preferably has a compression set in the range of from about 8.3 percent to about 43 percent, whereas compression set values in currently known state of the art foamed materials are significantly higher at between about 60 percent and 150 percent. In fact, with samples considered to be representative of the state of the art, compression set was measured by applicant to be 150 percent after 22 hours at 400° F. (204° C.). More preferably, the foamed material of the present invention has a compression set value in the range of from about 12 percent to about 20 percent, and most preferably the compression set value is about 12 percent.

The fluoroelastomer polymer foam material is also characterized by highly uniform, closed-cell microvoids having diameters of from about 0.002 mm to about 0.048 mm or less. The uniformity of the closed cell microvoids gives the foam material consistent physical properties throughout, making it well-suited for precision mechanical goods and dynamic applications. Further, the foam material of the invention can yield an approximately 50 percent reduction in initial density and preferably has a specific gravity of from about 0.86 to about 1.9. More preferably, the foam material is characterized by a specific gravity of from about 0.96 to about 1.26. In contrast, the specific gravity of prior art foams is typically from about 0.4823 to about 0.9645.

The fluoroelastomer polymer foam of the invention is also characterized by its integral skin. Some fluoroelastomer polymer formulations exhibit thick integral skins when foamed according to the method of the invention (e.g., the formulation designated 006 herein), while other fluoroelastomer polymer formulations exhibit only a minimal integral skin when foamed according to the invention (e.g., the formulation designated 002). The term integral skin as used herein means the external layer of foamed fluoroelastomer polymer of varying thickness which forms a continuous layer on the uniform, closed-cell microvoids beneath it. Because the integral skin when present forms a continuous layer atop the microvoids beneath it, it is necessary to remove the integral skin in order to view the underlying microvoids.

In order to meet cost, wear, permeability, and strength requirements for a desired fluoroelastomer polymer foam according to the invention, the integral skin can be varied in thickness by adjusting the pressure to which the foam is subjected. In general, as the pressure is increased, the integral skin will become thicker, while as the pressure is decreased, the integral skin will become thinner. The density of the foam material, as well as the integral skin thickness, can also be varied by one of ordinary skill in the art given the teachings herein by adjusting the process conditions such as temperature and pressure or by adjusting the ingredients in the foaming formulation.

The foamed fluoroelastomer of the invention also exhibits reduced thermal diffusivity. Specifically, the uniform, closed cell microvoids inhibit the transfer of heat, thus improving insulative properties. In addition, the foamed fluoroelastomer is preferably characterized by a Shore A durometer of from about 45 to about 62 points. In contrast, the durometer of prior art foams is typically from about 40 to about 50 points. Therefore, the foamed fluoroelastomer of the invention retains softness in conjunction with the other significant characteristics of the foam such as the improved compression set.

In addition to the above-mentioned characteristics, the fluoroelastomer foam is also characterized by an excellent dimensional consistency. Dimensional consistency is critical in the production of parts requiring exact dimensions such as copier rolls. The dimensional consistency of the fluoroelastomer foam, which results from the uniformity of the closed cell microvoids, allows a rubber pre-form to hold its shape while expanding, and prevents the formation of irregularities referred to as pits and waves.

The fluoroelastomer foam of the invention exhibits wear resistance comparable to the unfoamed parent fluoroelastomer polymer from which it is made, as well as comparable chemical and heat resistance. For example, the foamed material has been found to be suitable for environments operating at 400° F. (204° C.) with harsh chemical exposure. Such environments include those found in copy machines in which chemical agents such as dimethyl-based fluids typically attack copier rolls. Also, the microscopic, uniform nature of the closed cell microvoids of the foam material makes it ideal for the production of high tolerance parts which must have uniform density in order to prevent delamination. Additionally, the foam material is bondable with conventional fluoroelastomer adhesives and processes.

The present invention also provides a method for producing the foamed fluoroelastomer polymer of the invention. The first step of the method is that of dispersing in a fluoroelastomer polymer to be foamed a phenol-based blowing agent to produce a foaming formulation, and curing the formulation at a temperature in the range of from about 250° F. (121° C.) to about 450° F. (232° C.) and at a pressure of from about ambient pressure to about 3.0 atm to produce a foam. In one embodiment of the present invention, a metal oxide such as $MgO_2$ is also dispersed in the fluoroelastomer polymer to be foamed in order to capture any reaction water following the formation of microvoids. In the process of capturing reaction water, metal oxides help to breakup water particles and prevent the formation of large, irregular voids. The presence of a metal oxide results in the formation of particularly small, regular voids.

"Curing" according to the invention means the process of cross-linking the polymer chains of the fluoroelastomer polymer contained in the foaming formulation. This cross-linking, also referred to a vulcanization, imparts elasticity and strength to the fluoroelastomer polymer foam of the invention. The term pre-cure as used herein shall be understood to mean the initial steps associated with the curing process during which cross-linking of polymer chains and water formation occurs, and during which expansion of the foam is achieved. The term post-cure as used herein shall be understood to mean the curing steps following pre-cure during which additional cross-linking of polymer chains occurs and dimensional stabilization of the foam occurs. Also, during post-cure the remaining water and volatiles, if any, are driven off.

The term "fluoroelastomer" as used herein generally encompasses copolymers containing 65 percent to 69 percent fluorine and terpolymers containing 67 percent to 71 percent fluorine. Fluoroelastomer is defined to mean any fluorinated polymer exhibiting elastomeric behavior or having a low flexible modulus, i.e., high compliance, and containing one or more fluorinated monomers having ethylenic unsaturation, such as vinylidene fluoride. The types of fluoroelastomers which can be foamed according to the method of the invention are numerous. Most preferably, the fluoroelastomer polymer is 1-propene,1,1,2,3,3,3 hexafluoro, polymer with 1,1,-difluoroethene. Table 2 provides a list of some of the fluorocarbon elastomers which can be foamed according to the invention, including the trade names under which the various fluorocarbon elastomers are sold and their suppliers.

TABLE 2

| Copolymer | Trade Names | Suppliers |
| --- | --- | --- |
| poly(vinylidene fluoride-co-hexa-fluoropropylene) | Fluorel ®<br>Viton A<br>Tecnoflon<br>Dai-El | 3M<br>DuPont<br>Montedison<br>Daikin |
| poly(vinylidene fluoride-co-hexa-flouropropene-co-tetrafluoro-ethylene) | Viton B<br>Dai-El G-501 | DuPont<br>Daikin |
| poly(vinylidene fluoride-co-hexa-fluoropropylene-co-tetrafluoro-ethylene) plus cure site monomer | Viton G (peroxide curable) | DuPont |
| poly(vinylidene fluoride-co-tetra-fluoroethylene-co-perfluoromethyl vinyl ethyl) plus cure site monomer | Viton GLT (peroxide curable) | DuPont |
| poly(vinylidene fluoride-co-1-hydropentafluoropropylene-co-tetrafluoro-ethylene) | Tecnoflon T | Montedison |

In addition to these fluorocarbon copolymers, fluorocarbon terpolymers can also be foamed according to the invention including Fluorel® FE 58400, FX 11818, FT 2320, FE 5730, and FE 5830, which are all manufactured by 3M Corp.

According to the preferred method of the invention, a phenol-based blowing agent is first dispersed in a fluoroelastomer polymer to be foamed in order to produce a foaming formulation. The term phenol-based blowing agent as used herein shall be understood to mean any compound used as a blowing agent in which the active group is phenolic in nature. The term foaming formulation as used herein means a formulation including a phenol-based blowing agent and a fluoroelastomer polymer that when subjected to the temperatures and pressures according to the invention foams to form the fluoroelastomer polymer foam of the invention.

In practicing the present invention, it is preferred that the foaming formulation include between about 62 weight percent to about 72 weight percent of the fluoroelastomer polymer. For example, in formulation 002 (discussed in Example 1 below), the preferred amount is 62.39 weight percent of the fluoroelastomer polymer 1-propene,1,1,2,3, 3,3 hexafluoro, polymer with 1,1,-difluoroethene, while for formulation 006 (also discussed in Example 1), the preferred amount is 69.33 weight percent of the fluoroelastomer polymer.

A preferred phenol-based blowing agent used in practicing the present invention is a bisphenol A. More preferably the blowing agent is phenol,4,4'-[2,2,2-trifluoro-1-(trifluoro-methyl)ethylidene bis. However, other phenol-based blowing agents in which phenol is the active agent can be used in practicing the present invention. While other blowing agents exist which are not phenol based, such non-phenol based blowing agents do not provide the improved compression set values of the invention. As a result, fluoroelastomer polymer foams formed with non-phenol based blowing agents are most likely to collapse upon the application of a substantial load or weight to the foam.

Preferably the phenol-based blowing agent is present in an amount from about 0.622 weight percent to about 2.268 weight percent of the total foaming formulation. When the blowing agent is a bisphenol A, preferably it is present in an amount from about 1.0 to about 2.0 weight percent of the total polymer fraction.

For formulation 002, the preferred amount is 1.45 weight percent of the total foaming formulation of phenol,4,4'-[2, 2,2-trifluoro-1-(trifluoro-methyl)ethylidene bis, while for formulation 006, the preferred amount is 1.06 weight percent of the total foaming formulation.

In practicing the present invention, and in order to ensure uniform properties in the foam for the production of precision mechanical parts, it is necessary that uniform dispersion of the phenol-based blowing agent in the fluoroelastomer polymer is achieved and that the phenol-based blowing agent is sufficiently soluble in the fluoroelastomer polymer base. Adequate dispersion can be achieved by the use of various chemical dispersing aids such as methylethylketone ("MEK"). Adequate dispersion can also be achieved by mixing the ingredients in the foaming formulation by using, for example, a banbury, roll mill, a twin screw or single screw extruder or any of a variety of other extruder type mixers known to those in the art. Foams with acceptable uniformity may be obtained by using certain fluoroelastomer products from 3M Corp. which already have phenols incorporated therein as part of a "cure package." These include products sold under the trade names Fluorel® FC 2123, FC 2176, FC 2144, FC 2152, and FC 2172. Also, DuPont sells a fluoroelastomer product under the trade name Viton® that can be purchased with phenols preincorporated into the product.

The processing equipment required to practice the invention is conventional in nature and readily available. The compositions which have been discussed can be processed by a variety of types of rubber and plastic processing equipment which includes, but is not limited to, roll mill, banbury, and extruder type mixers. The product can be molded or extruded into a finished shape by persons of ordinary skill in the art given the teachings herein.

In practicing the method of the invention, the temperature is adjusted to a temperature in the range of from about 250° F. (121° C.) to about 450° F. (232° C.). More preferably, the temperature is in the range of from about 270° F. (132° C.) to about 400° F. (204° C.). At temperatures greater than about 450° F. (232° C.), water in the form of steam will expand so rapidly that the cell walls of any microvoids that may have formed tend to rupture resulting in the formation of blisters or large, irregular voids as opposed to uniform, closed-cell microvoids. In contrast, at temperatures below about 250° F. (121° C.), the rate of water evolution tends to be so low that few microvoids are formed. If metal oxides such as $MgO_2$ are also present in the foaming formulation, the water that is formed tends to be scavenged by the $MgO_2$ before microvoids can be formed.

According to the invention, some foaming formulations are cured at more typical curing temperatures, while other foaming formulations are cured at temperatures that are substantially below normal curing temperatures. The temperature at which a particular foaming formulation is cured is governed by the viscosity and geometry or configuration of the material being foamed. For formulation 002, the temperature is preferably adjusted to a temperature in the range of from about 300° F. (149° C.) to about 400° F. (204° C.), with optimal results achieved at a temperature of about 400° F. (204° C.), while for formulation 006, the temperature is preferably adjusted to a temperature in the range of from about 270° F. (132° C.) to about 300° F. (149° C.), with optimal results achieved at a temperature of about 270° F. (132° C.)

The pressure at which typical prior art curing reactions occurs is between about 1000 psi to about 3000 psi in a twenty inch ram press. In practicing the method of the invention, the foaming formulation is cured at a very low pressure in the range of from about ambient pressure to about 3.0 atm. Preferably the foaming formulation is cured at about ambient pressure.

In light of the numerous advantageous properties described above including its low weight, the foamed material is an ideal replacement for silicone in some instances both on a cost and performance basis. In copier and business machine applications, this material can replace silicone rolls currently used in harsh machine environments. Copier rolls made with the foamed material exhibit superior resistance to chemical attack at high operating temperatures (approximately 400° F. (204° C.)) typically found in copiers. These rolls may also be machined to high precision tolerances and are expected to last the life of the machine. Process studies to date indicate that the integral skin may be machined to very tight tolerances suitable for high tolerance, high performance copier machine components. The foam also exhibits excellent wear resistance compared to the current state of the art foams and can be fabricated with varying hardness to replace other materials.

Using the foam material of the invention, fluoroelastomer sponge seals and gaskets may be prepared with exceptionally low compression set properties. These seals and gaskets exhibit excellent chemical and heat resistance, low durometer, and low density. Applications for such products include use in the electronics and automotive industries, as well as use as a replacement for silicone and fluoroelastomer based seals and gaskets. Also, the foam material of the invention can be used in numerous biomedical applications such as, but not limited to, soft tissue implants.

Fluoroelastomer sponge hose may also be prepared with excellent chemical and heat resistance. This type of hose is well suited for the transportation of hot gas phase material due to its low permeability. An example of such an application is in carburetor hoses. Other applications include hoses requiring immersion in aggressive fluids for pumping such as hoses used in automobile fuel tanks.

The present invention is further described in the following examples which are provided for illustrative purposes only and are not to be construed as limiting.

EXAMPLE 1

Various formulations designated 001 through 006 were processed using low temperatures and ambient pressure to cause the foaming reaction. The ingredients and weight percent ranges of these ingredients for the various formulations tested are set forth in Table 3.

TABLE 3

| Ingredient | Weight % Range |
|---|---|
| carbon black | 9.70 to 21.50 |
| hydrocarbon wax | 0.3 to 1.30 |
| dibutyl sebacate | 0 to 1.30 |
| pentaerythrityl tetrastearate | 0 to 0.70 |
| magnesium oxide | 1.90 to 2.20 |
| calcium hydroxide | 3.70 to 4.30 |
| fluorochemical alcohol | 0 to 1.05 |
| calcium carbonate | 0 to 0.35 |
| $CaSiO_3$ | 0 to 16.60 |
| 1-propene,1,1,2,3,3,3 hexafluoro, polymer with 1,1,-difluoroethene | 61.90 to 71.80 |
| phenol,4,4'-[2,2,2-trifluoro-1-(trifluoro-methyl) ethylidene bis- | 0.622 to 2.268 |
| benzene,1,1'-sulfonylbis[4-chloro-] | 0.621 to 1.420 |
| phosphonium, tributyl [-2-propenyl] chloride | 0.005 to 0.008 |

Samples were evaluated for reductions in specific gravity and consistency of foaming action. The results, shown in Table 4, indicate that while foaming according to the invention occurred with all of the formulations tested, the degree of foaming and the consistency of the foam varied.

TABLE 4

| FORMULATION NO. | INITIAL SPECIFIC GRAVITY | FINAL SPECIFIC GRAVITY | DESCRIPTION OF FOAM |
|---|---|---|---|
| FOAMING CONDITIONS: 15 MINUTES AT 400° F. (240° C.) | | | |
| 001 | 1.75 | 1.04 | SOME FOAM |
| 002 | 1.71 | 1.11 | GOOD STRUCTURE |
| 003 | 1.68 | 0.86 | IRREGULAR VOIDS |
| 004 | 1.81 | 0.94 | IRREGULAR VOIDS |
| 005 | 1.78 | 0.99 | IRREGULAR VOIDS |
| FOAMING CONDITIONS: 15 MINUTES AT 300° F. | | | |
| 001 | 1.75 | 1.55 | SOME FOAM |
| 002 | 1.71 | 1.18 | GOOD STRUCTURE |
| 003 | 1.68 | 1.47 | VERY LITTLE FOAM |
| 004 | 1.81 | 1.67 | LEAST FOAM |
| 005 | 1.78 | 1.39 | SLIGHT FOAM |
| FOAMING CONDITIONS: 15 MINUTES AT 350° F. | | | |
| 006 | 1.77 | 1.07 | IRREGULAR VOIDS |
| FOAMING CONDITIONS: 15 MINUTES AT 300° F. | | | |
| 006 | 1.77 | 1.63 | VERY LITTLE FOAM |
| FOAMING CONDITIONS: 25 MINUTES AT 300° F. | | | |
| 006 | 1.77 | 1.3 | GOOD STRUCTURE |

As evidenced by Table 4, some formulations demonstrated very little foaming action, while others demonstrated large irregular voids referred to as blisters. However, two formulations, designated 002 and 006, produced regular uniform foam products. Formulation 002 demonstrated the best overall foam, while formulation 006 demonstrated the best foam and integral skin combination. The various ingredients in formulations 002 and 006 with their respective weight percent ranges are set forth in Table 5 which shows the preferred foaming formulations for practicing the invention.

TABLE 5

| Ingredient | Formulation 002 Weight % Range | Formulation 006 Weight % Range |
|---|---|---|
| carbon black | 9.70 | 21.75 |
| hydrocarbon wax | 1.30 | 0.3 |
| dibutyl sebacate | 1.30 | — |
| pentaerythrityl tetrastearate | 0.70 | — |
| magnesium oxide | 1.90 | 2.2 |
| calcium hydroxide | 4.1 | 4.3 |
| CaSiO$_3$ | 16.2 | — |
| 1-propene,1,1,2,3,3,3 hexafluoro, polymer with 1,1,-difluoroethene | 62.39 | 69.33 |
| phenol,4,4'-[2,2,2-trifluoro-1-(trifluoro-methyl) ethylidene bis- | 1.45 | 1.06 |
| benzene,1,1'-sulfonylbis[4-chloro-] | 0.966 | 1.06 |

Formulations 004 and 005 also exhibited foaming according to the invention. The various ingredients in formulations 004 and 005 with their respective weight percent ranges are set forth in Table 6.

TABLE 6

| Ingredient | Formulation 004 Weight % Range | Formulation 005 Weight % Range |
|---|---|---|
| carbon black | 17.400 | 9.90 |
| hydrocarbon wax | 0.700 | 0.700 |
| pentaerythrityl tetrastearate | — | 0.700 |
| magnesium oxide | 3.700 | 2.000 |
| calcium hydroxide | 3.700 | 4.000 |
| fluorochemical alcohol | 1.050 | — |
| calcium carbonate | 0.350 | — |
| CaSiO$_3$ | — | 16.500 |
| 1-propene,1,1,2,3,3,3 hexafluoro, polymer with 1,1,-difluoroethene | 71.227 | 64.050 |
| phenol,4,4'-[2,2,2-trifluoro-1-(trifluoro-methyl] ethylidene bis- | 0.933 | — |
| benzene,1,1'-sulfonylbis[4-chloro-] | 0.932 | 0.990 |
| phosphonium, tributyl -2-propenyl chloride | 0.008 | 1.160 |

The various ingredients set forth above in Tables 5 and 6 are produced by, among others, 3M Corp., C. P. Hall, Rhein Chemie, and Cabot and are sold under a variety of trade names including those set forth in Table 7.

TABLE 7

| | |
|---|---|
| carbon black | Grades N-990, N-762 |
| hydrocarbon wax | Carnauba Wax, VPA #2 |
| dibutyl sebacate | DBS Liquid, Merrol DBS |
| pentaerythrityl tetrastearate | Aflux 54 |
| magnesium oxide | Maglite ® D, Elastomag 170 |
| calcium hydroxide | Calcium Hydroxide HP |
| fluorochemical alcohol | Dynamar PPA-790 |
| calcium carbonate | |
| CaSiO$_3$ | Nyad 400 |
| 1-propene,1,1,2,3,3,3 hexafluoro polymer with 1,1,-difluoroethene | Fluorel ® FC 2178 |
| 1-propene,1,1,2,3,3,3 hexafluoro polymer with 1,1,-difluoroethene | Fluorel ® FC 2123 FC 2176 FC 2144 |
| phenol,4,4'-[2,2,2-trifluoro-1-(trifluoro-methyl) ethylidene bis-benzene,1,1'-sulfonylbis[4-chloro-] | FC 2152 |
| 1-propene,1,1,2,3,3,3 hexafluoro polymer with 1,1,-difluoroethene | Fluorel ® FC 2172 |
| phenol,4,4'-[2,2,2-trifluoro-1-(trifluoro-methyl) ethylidene bis-phosphonium, tributyl [-2-propenyl] chloride | |

EXAMPLE 2

Formulation 002 was selected for further evaluation. As shown in Table 8, a comparison of specific gravities of the foamed and unfoamed states reveals that a significant reduction in specific gravity was achieved.

TABLE 8

EVALUATION OF FORMULATION 002 PHYSICAL PROPERTIES AFTER FOAMING AT DIFFERENT TEMPERATURES

FORMULATION: 002
FOAMING TIME: 15 MINUTES
POST-CURE: 16 HOURS AT 400° F. (204° C.)

| | INITIAL | % CHANGE FROM ORIGINAL |
|---|---|---|
| ORIGINAL PROPERTIES: | | |
| SPECIFIC GRAVITY: | 1.905 | |
| SHORE A, DUROMETER: | 79.00 | |
| COMPRESSION SET (22 HRS. @ 400° F.): | 19.70 | |
| FOAMING TEMPERATURE: | 300° F. (149° C.) | |
| SPECIFIC GRAVITY: | 1.252 | −34.28 |
| SHORE A, DUROMETER: | 48 | −39.24 |
| COMPRESSION SET (22 HRS. @ 400° F.): | 43.1 | +118.78 |
| FOAMING TEMPERATURE: | 320° F. (160° C.) | |
| SPECIFIC GRAVITY: | 1.347 | −29.29 |
| SHORE A, DUROMETER: | 45 | −43.04 |
| COMPRESSION SET (22 HRS. @ 400° F.): | 32.2 | +63.45 |
| FOAMING TEMPERATURE: | 375° F. (190° C.) | |
| SPECIFIC GRAVITY: | 1.24 | −34.91 |
| SHORE A, DUROMETER: | 45 | −43.03 |
| COMPRESSION SET (22 HRS. @ 400° F.): | 17.90 | −9.13 |
| FOAMING TEMPERATURE: | 400° F. (204° C.) | |
| SPECIFIC GRAVITY: | 1.260 | −33.85 |
| SHORE A, DUROMETER: | 48 | −39.24 |
| COMPRESSION SET (22 HRS. @ 400° F.): | 23.60 | +19.79 |

As indicated by Table 8, measurements also indicated a significant reduction in hardness. However, the most significant finding was that the compression set values remained consistently low in the 18 percent to 43 percent range. This proved that which previously was unknown (i.e., significant reductions in density can be achieved with a blowing agent while retaining low compression set values).

EXAMPLE 3

Formulation 006 was next evaluated due to its thick integral skin formation and good foaming characteristics. This formulation was studied at 270° F. (132° C.), 280° F. (138° C.), and 290° F. (143° C.) after first allowing it to foam for 30 minutes and 60 minutes with a post-cure time of 16 hours at 400° F. (204° C.). As illustrated by the data set forth in Table 9, evaluation of hardness, specific gravity, and compression set of the samples showed that even greater reductions in compression set were achieved with significant reductions in specific gravity.

TABLE 9

EVALUATION OF FORMULATION 006 FOAM CURED FOR 60 MINUTES AND POST-CURED 16 HOURS AT 400° F. (204° C.)

| | | SHORE A HARDNESS | SPECIFIC GRAVITY | COMPRESSION SET % (22 HRS @ 400° F.), |
|---|---|---|---|---|
| CURE TEMPERATURE: | 290° F. (143° C.) | 52 | 1.216 | 15.40 |
| CURE TEMPERATURE: | 280° F. (138° C.) | 56.5 | 1.342 | 14.30 |
| CURE TEMPERATURE: | 270° F. (132° C.) | 62.1 | 1.270 | 26.2 |

In fact, with formulation 006, I have achieved compression set values as low as 8.3 percent after 22 hours at 400° F. (204° C.). The above data was taken from an extruded hose. It was therefore possible to take very accurate measurements regarding uniformity and reproducibility of the foaming process by supporting the interior of the extrusion with a metal insert of consistent dimensions. Dimensional data from samples fabricated as described above is presented in Table 10.

TABLE 10

VARIOUS PRE-CURE TEMPERATURES AT 60 MINUTES WITH A POST-CURE AT 400° F. (204° C.) AND 16 HOURS

| | PERCENTAGE OF DIAMETER EXPANSION AT VARIOUS POSITIONS ON ROLLERS | | |
|---|---|---|---|
| TEMPERATURE | END # | MIDDLE # | CENTER |
| 290° F. (143° C.) | 13.06 ± 0.77 | 13.74 ± 0.68 | 13.18 ± 1.41 |
| 280° F. (138° C.) | 11.00 ± 1.35 | 10.58 ± 0.62 | 11.08 ± 1.14 |
| 270° F. (132° C.) | 10.28 ± 0.34 | 10.04 ± 0.69 | 10.08 ± 0.66 |

Figure 1A:
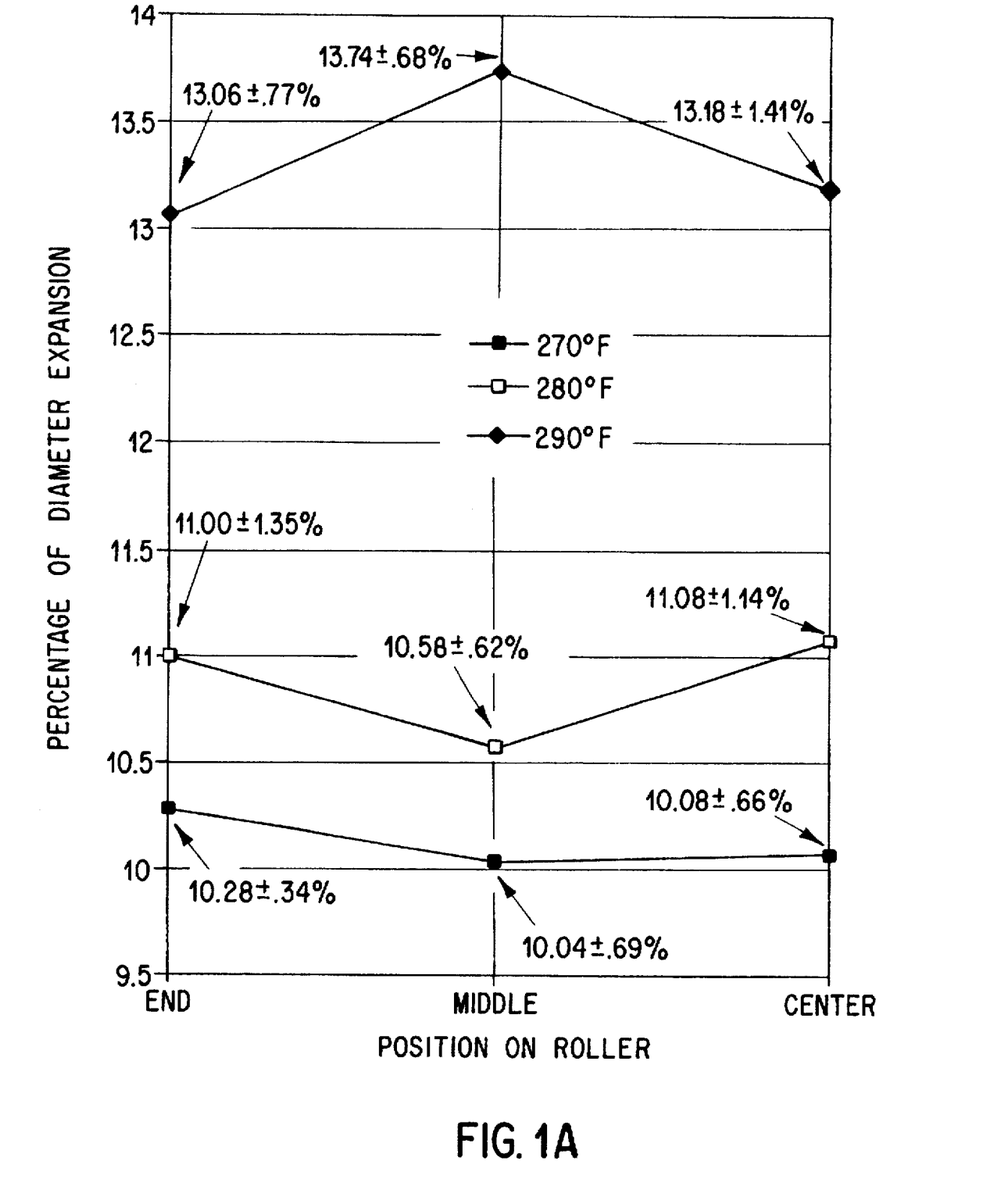
FIG. 1A shows the percentage of diameter expansion for samples of formulation 006 at various pre-cure temperatures with post-cure at 400° F. (204° C.) for 16 hours.
Figure 1B:
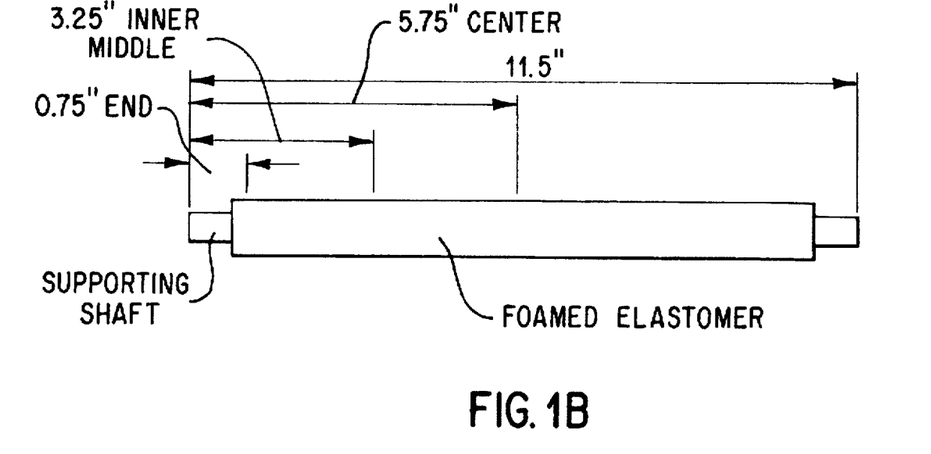
FIG. 1B shows the configuration of the same samples of formulation 006, as well as the position on the copier roller where measurements were taken.

This data indicates that maximum uniformity and consistency were obtained at 270° F. (132° C.) for this particular formulation. However, maximum dimensional expansion was achieved at 290° F. (143° C.). It should be noted that ambient pressure was used in fabricating the samples. FIG. 1A shows a graph comparing the samples, as well as the configuration of the samples and where the measurements were taken. FIG. 1B shows the configuration of the various samples of formulation 006, as well as the position on the roller where measurements were taken in accordance with this invention.

EXAMPLE 4

Figure 2A:
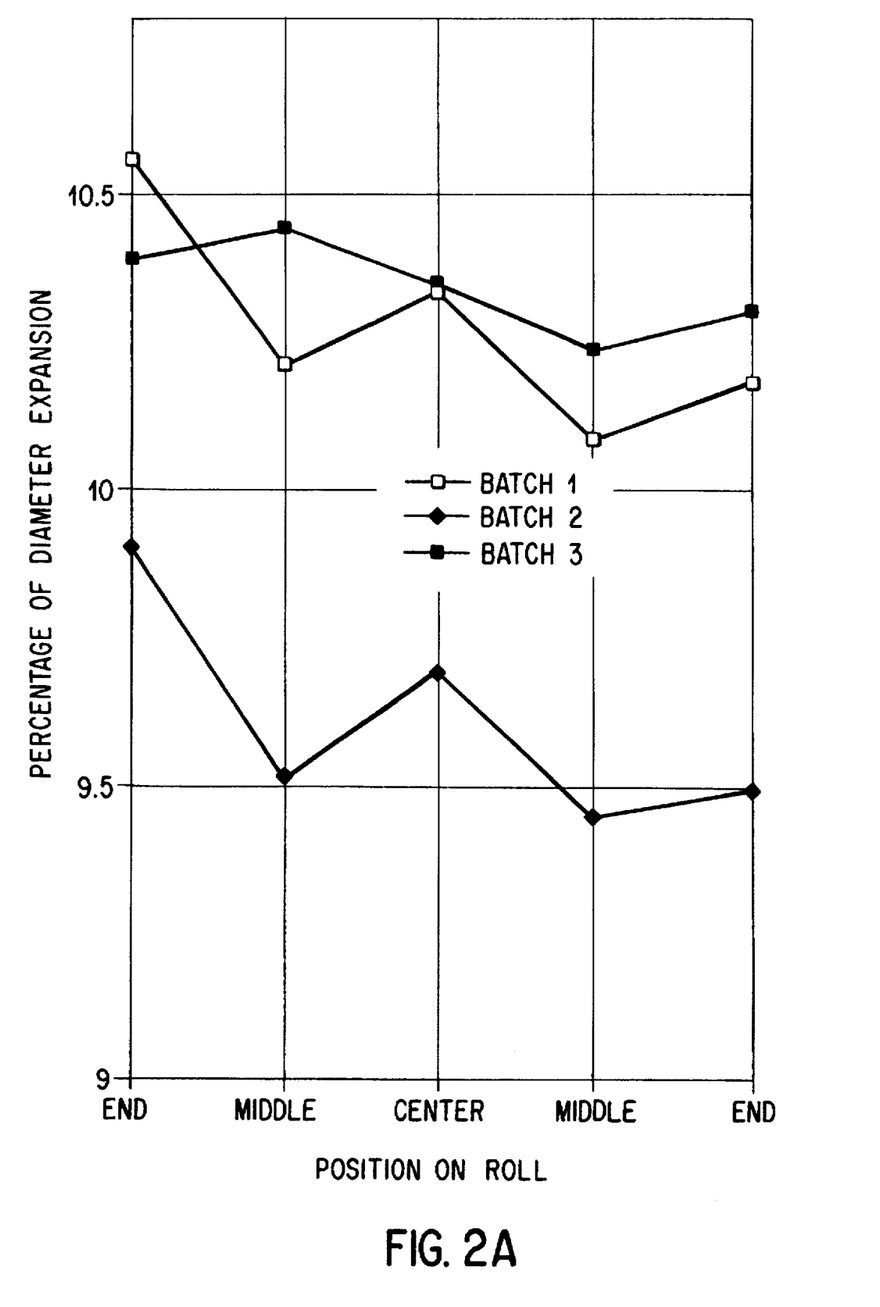
FIG. 2A shows the percentage of diameter expansion for additional samples of formulation 006 at a pre-cure temperature of 270° F. (132° C.) for 60 minutes and post-cure at 400° F. (204° C.) and 16 hours.

Based on this data, additional samples were fabricated from formulation 006 and measured to determine the reproducibility of the process. Three batches of samples were fabricated at 270° F. (132° C.). Batch 1 and 2 contained 10 samples, while batch 3 contained 8. These samples were cured for one hour and post cured for 16 hours at 400° F. (204° C.). The data, set forth in Table 11 and plotted in FIG. 2A, where all data points are based on the average of two readings, shows excellent reproducibility.

TABLE 11

DIMENSIONAL CONSISTENCY OF BATCHES OF FORMULATION 006 FOAMED 60 MINUTES AT 270° F. (132° C.) AND POST-CURED 16 HOURS AT 400° F. (204° C.)

| | AVERAGE PERCENTAGE OF DIAMETER EXPANSION OVER LENGTH OF THE EXTRUSION | | | | | |
|---|---|---|---|---|---|---|
| | BATCH NO. | END | MIDDLE | CENTER | MIDDLE | END |
| % EXPANSION | 1 | 10.56 | 10.21 | 10.23 | 10.08 | 10.17 |
| STD. DEV. | | 0.75 | 0.63 | 0.59 | 0.48 | 0.48 |
| % EXPANSION | 2 | 9.90 | 9.51 | 9.69 | 9.44 | 9.48 |
| STD. DEV. | | 0.63 | 0.56 | 0.58 | 0.74 | 0.84 |
| % EXPANSION | 3 | 10.39 | 10.44 | 10.34 | 10.23 | 9.70 |
| STD. DEV. | | 0.83 | 0.55 | 0.67 | 0.85 | 0.39 |
| AVG. % EXPANSION FOR ALL BATCHES | 10.28 | 10.04 | 10.08 | 9.91 | 9.79 | |
| STD. DEV. | 0.29 | 0.40 | 0.29 | 0.35 | 0.30 | |

Figure 2B:
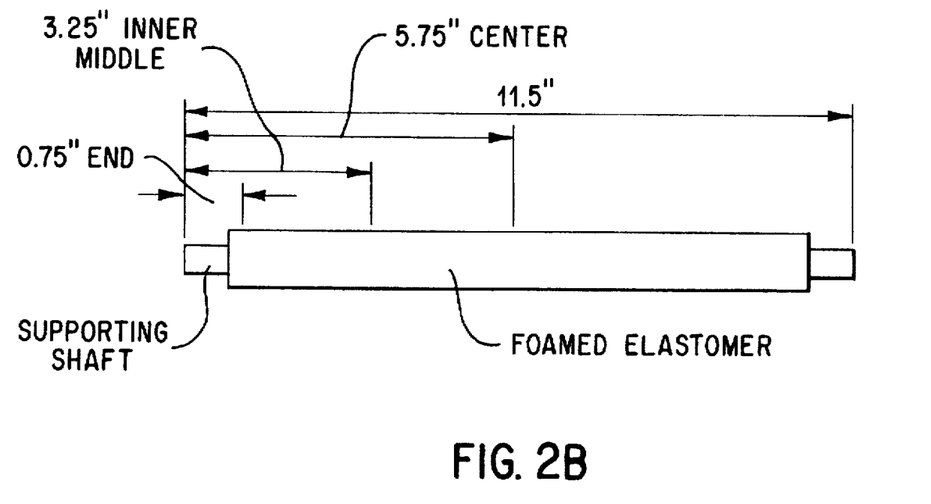
FIG. 2B shows the configuration of the additional samples of formulation 006, as well as the position on the roller where measurements were taken.

Standard deviations varied less than (+/−) 0.84 within a batch. The maximum standard deviation between batches was (+/−) 0.40 using weighted averages for populations of each batch point. FIG. 2B is a schematic drawing showing the configuration of the various additional samples of formulation 006, as well as the position on the roller where measurements were taken.

EXAMPLE 5

Sheets of 006 were fabricated by foaming one hour at 300° F. (149° C.) and post curing 16 hours at 400° F. (204° C.). Data shown in Table 12 gives the original physical properties (hardness, tensile strength, and elongation), as well as physical property changes after heat aging and exposure to ASTM #1 and #3 oils.

TABLE 12

PHYSICAL PROPERTIES OF FORMULATION 006 FOAMED 60 MINUTES AT 300° F. (149° C.) AND POST-CURED 16 HOURS AT 400° F. (204° C.)

| | | INITIAL | % CHANGE FROM ORIGINAL |
|---|---|---|---|
| ORIGINAL PROPERTIES | DUROMETER, SHORE A | 55.00 | — |
| | TENSILE STRENGTH, PSI | 680.50 | — |
| | ELONGATION, % | 214.00 | — |
| | TEAR C, PI | 80.20 | — |
| | SPECIFIC GRAVITY | | — |
| HEAT AGED 70 HRS. @ 475° F. (246° C.) | DUROMETER, SHORE A | 60.00 | 9.10 |
| | TENSILE STRENGTH, PSI | 827.00 | 21.50 |
| | ELONGATION, % | 161.00 | −24.80 |
| 22 HRS @ 400° F. | COMPRESSION SET, % | 27.10 | — |
| ASTM #1 OIL, 70 HRS. @ 300° F. (149° C.) | DUROMETER, SHORE A | 50.00 | −5.00 |
| | TENSILE STRENGTH, PSI | 663.60 | −2.50 |
| | ELONGATION, % | 228.00 | +6.50 |
| | VOLUME SWELL, % | — | +0.30 |
| ASTM #3 OIL, 70 HRS. @ 300° F. (149° C.) | DUROMETER, SHORE A | 50.00 | −5.00 |
| | TENSILE STRENGTH, PSI | 614.10 | −9.80 |
| | ELONGATION, % | 211.00 | −1.40 |
| | VOLUME SWELL, % | — | +1.50 |

After exposure to the more polar hydrocarbon oil (ASTM #3) for 70 hours at 300° F. (149° C.), tensile properties showed less than a ten percent change. These results support the suitability of such materials for seals and gaskets. Compression set evaluation showed the material yielded values of only 27 percent after testing for 22 hours at 400° F. (204° C.). Samples were also heat aged for 70 hours at 475° F. (246° C.). Tensile strength increased approximately 20 percent with a decrease in elongation of approximately 25 percent.

EXAMPLE 6

Additional sheets of 006 were fabricated by foaming one hour at 270° F. (132° C.) and post curing 16 hours at 400° F. (204° C.) Data shown in Table 13 gives the original physical properties (hardness, tensile strength, and elongation), as well as physical property changes after heat aging and exposure to automatic transmission fluid ("ATF") MOPAR 7176.

TABLE 13

| | DUROMETER, SHORE A | 50.00 |
|---|---|---|
| ORIGINAL | TENSILE, PSI | 577.40 |
| PROPERTIES | ELONGATION, % | 200.00 |
| HEAT AGED | DUROMETER, SHORE A | 65.00 |
| 70 HRS. @ 300° F. | TENSILE, PSI | 711.50 |
| (149° C.) | ELONGATION, % | 190.00 |
| 22 HRS @ 400° F. | COMPRESSION SET, % | 11.50 |
| 70 HRS @ 300° F. | COMPRESSION SET, % | 12.00 |
| ATF MOPAR | DUROMETER, SHORE A | 65.00 |
| 7176, 70 HRS | TENSILE, PSI | 637.00 |
| @ 300° F. | ELONGATION, % | 199.00 |
| | VOLUME CHANGE, % | +0.29 |
| ATF MOPAR | DUROMETER, SHORE A | 55.00 |
| 7176, 168 HRS | TENSILE, PSI | 452.00 |
| @ 300° F. | ELONGATION, % | 197.00 |
| | VOLUME CHANGE, % | +0.80 |
| ATF MOPAR | DUROMETER, SHORE A | 57.00 |
| 7176, 504 HRS | TENSILE, PSI | 539.00 |
| @ 300° F. | ELONGATION, % | 187.90 |
| | VOLUME CHANGE, % | +0.80 |
| | SPECIFIC GRAVITY | 1.308–1.185 |

"Compression set" as used herein was measured using standard type 1 specimens defined by the ASTM protocol as cylindrical disks cut from laboratory prepared slabs having a thickness of 12.5±0.5 mm (0.49±0.02 in.) and a diameter of 29.0±0.5 mm (1.14±0.02 in.) while utilizing the procedures of Test Method B (Compression Set Under Constant Deflection in Air). The details of the protocol utilized for measuring compression set are as follows:

APPARATUS

A dial micrometer was used for measuring the specimen thickness in accordance with Practice D 3767, Method A1, in the Annual Book of ASTM Standards, Vol. 09.01. For vulcanizates having a hardness below 35 IRHD, the force on the presser foot should be reduced to 0.2±0.05N (0.04±0.01 lbf).

Spacer bars for type 1 samples having a thickness of 9.5±0.02 mm (0.375±0.001 in.) were used to maintain the constant deflection required under Test Method B.

A compression device was used consisting of two or more flat steel plates between the parallel faces of which the specimens were compressed. Steel spacers for the required percentage of compression were placed on each side of the specimens to control their thickness while compressed. The steel surfaces contacting the specimens should be ground to a maximum roughness of 250 μm (10 μin.) and then chromium plated and polished.

The plates between which the test specimens were compressed were made of steel of sufficient thickness to withstand the compressive stresses without bending. The surfaces against which the specimens were held had a highly polished chromium-plated finish and were cleaned thoroughly and wiped dry before each test.

An oven conforming to the specification for a Type IIB laboratory oven given in Specification E 145, Annual Book of ASTM Standards, Vol. 14.02, was also employed.

Procedure

The original thickness of the specimens was measured to the nearest 0.02 mm (0.001 in.). The specimens were placed on the anvil of the dial micrometer so that the presser foot would indicate the thickness at the central portion of the top and bottom faces.

The application of compressive force involved placing the test specimens between the plates of the compression device with the spacers on each side, allowing sufficient clearance for the bulging of the specimens when compressed. Where a lubricant is applied, it should consist of a thin coating of a lubricant having substantially no action on the specimens. For most purposes, a silicon or fluorosilicon fluid is suitable. Lubrication of the operating surfaces of the compression device is optional while giving more reproducible results; lubrication may somewhat alter the compression set values. The bolts were then tightened so that the plates were drawn together uniformly until they are were in contact with the spacers. The amount of compression employed was approximately 25%. A suitable mechanical or hydraulic device may be used to facilitate assembling and disassembling the test fixture.

A suitable temperature, preferably chosen from those listed in Practice D 1349, Annual Book of ASTM Standards, Vols. 09.01 and 09.02, and a suitable time should be chosen for the compression set which depend upon the conditions of the expected service. In comparative tests, identical temperature and test periods should be employed. According to Test Method B, suggested test periods are 22 hours and 70 hours. The test specimens were at room temperature when inserted in the compression device and the assembled compression device was then placed in the oven within 2 hours after completion of the assembly and allowed to remain there for the required test period in dry air at the test temperature selected. At the end of the test period, the compression device was extracted from the oven and the test specimens were immediately removed and allowed to cool.

While cooling, the test specimens were allowed to rest on a poor thermally conducting surface such as wood for 30 minutes before making the measurement of the final thickness. The cooling period was conducted at a standard laboratory temperature of 23°±2° C. (73.4°±3.6° F.). Specimens whose compression set property is affected by atmospheric moisture should be cooled in an atmosphere controlled to 50±5% relative humidity.

After the rest period, the final thicknesses of the specimens were measured at the center of each specimen in accordance with the procedures detailed above for measuring original thickness.

Calculations

The compression set expressed as a percentage of the original deflection was calculated as follows:

$$C_B = [(t_o - t_i)/(t_o - t_a)] \times 100$$

where:

$C_B$=compression set expressed as percentage of the original deflection, $t_i$=original thickness of specimen,
$t_f$=final thickness of specimen, and
$t_a$=thickness of the spacer bar used.

The above description and drawings are only illustrative of a preferred embodiment which achieves the objects, features, and advantages of the present invention, and it is not intended that the present invention be limited thereto. Any modifications of the present invention which come within the spirit and scope of the following claims is considered part of the present invention.

I claim:

1. A fluoroelastomer polymer foam produced by the steps of:
   obtaining a fluoroelastomer polymer formulation comprising a fluoroelastomer polymer and a phenol-based blowing agent; and
   curing said formulation at a sufficient temperature and pressure to produce a foam;
   said foam having a compression set value about 43% or less when tested at 400° F. after 22 hours, and closed cell microvoids having diameters about 0.048 mm or less.

2. The fluoroelastomer polymer foam of claim 1 further comprising the step of disbursing said phenol-based blowing agent in said fluoroelastomer polymer.

3. The fluoroelastomer polymer foam of claim 2 further comprising the step of disbursing a metal oxide in said fluoroelastomer polymer.

4. The fluoroelastomer polymer foam of claim 1 wherein said fluoroelastomer is 1-propene,1,1,2,3,3,3 hexafluoro, polymer with 1,1,-difluoroethene.

5. The fluoroelastomer polymer foam of claim 1 wherein said compression set value is about 20% or less.

6. The fluoroelastomer polymer foam of claim 1 wherein said compression set value is about 8.3% or more.

7. The fluoroelastomer polymer foam of claim 1 wherein said compression set value is about 12% or more.

8. The fluoroelastomer polymer foam of claim 1, wherein said foam has an integral skin.

9. The fluoroelastomer polymer foam of claim 1 wherein said foam has a specific gravity of about 0.86 to about 1.9.

10. The fluoroelastomer polymer foam of claim 1 wherein said foam is in the form of a copier roll.

11. The fluoroelastomer polymer foam of claim 1 wherein said foam is in the form of a seal or gasket.

12. The fluoroelastomer polymer foam of claim 1 wherein said foam is in the form of a hose.

13. The fluoroelastomer polymer foam of claim 1 wherein said temperature is about 250° F. to about 450° F.

14. The fluoroelastomer polymer foam of claim 13 wherein said pressure is about 3 atmospheres or less.

* * * * *